US012647404B2

(12) United States Patent
Young

(10) Patent No.: US 12,647,404 B2
(45) Date of Patent: Jun. 2, 2026

(54) COORDINATION AND MANAGEMENT OF KEYS AND INSTRUCTIONS FOR MULTIPLE ENCRYPTION

(71) Applicant: DigiCert, Inc., Lehi, UT (US)

(72) Inventor: Tanner Young, Eagle Mountain, UT (US)

(73) Assignee: DigiCert, Inc., Lehi, UT (US)

( * ) Notice: Subject to any disclaimer, the term of this patent is extended or adjusted under 35 U.S.C. 154(b) by 183 days.

(21) Appl. No.: 18/471,041

(22) Filed: Sep. 20, 2023

(65) Prior Publication Data

US 2025/0097207 A1     Mar. 20, 2025

(51) Int. Cl.
*H04L 9/40*          (2022.01)
(52) U.S. Cl.
CPC .......... *H04L 63/062* (2013.01); *H04L 63/045* (2013.01)
(58) Field of Classification Search
CPC .. H04L 63/062; H04L 63/045; H04L 63/0478
See application file for complete search history.

(56) References Cited

U.S. PATENT DOCUMENTS

| | | | |
|---|---|---|---|
| 6,553,493 B1 | | 4/2003 | Okumura et al. |
| 9,270,449 B1 | * | 2/2016 | Tribble ............... H04L 63/0435 |
| 9,350,536 B2 | | 5/2016 | Sabin |
| 10,277,580 B1 | | 4/2019 | Klieman et al. |
| 11,206,134 B2 | | 12/2021 | Kumar et al. |
| 2011/0208962 A1 | | 8/2011 | Andrews et al. |
| 2014/0019762 A1 | | 1/2014 | Sabin |
| 2016/0269412 A1 | * | 9/2016 | Farah ...................... H04L 63/10 |
| 2016/0365985 A1 | | 12/2016 | Pilcher et al. |
| 2017/0270283 A1 | * | 9/2017 | Shiraishi ............... G06F 21/602 |
| 2021/0036851 A1 | * | 2/2021 | Villapakkam ......... G06F 21/602 |
| 2022/0092168 A1 | | 3/2022 | Brown et al. |
| 2022/0417037 A1 | * | 12/2022 | Ounsworth ........... H04L 9/3268 |

* cited by examiner

*Primary Examiner* — Henry Tsang
(74) *Attorney, Agent, or Firm* — Baratta Law PLLC; Lawrence A. Baratta, Jr.

(57)          ABSTRACT

Systems and methods for coordination and management of keys and instructions for multiple encryption include, responsive to receiving encrypted data that has been encrypted via a plurality of layers of encryption, accessing a coordinator to determine instructions for multiple encryption; and decrypting the encrypted data based on the instructions and utilizing a plurality of keys with a key for each of the plurality of layers of encryption.

8 Claims, 3 Drawing Sheets

100
110
102
106
104
108
112
114
_FIG. 1_

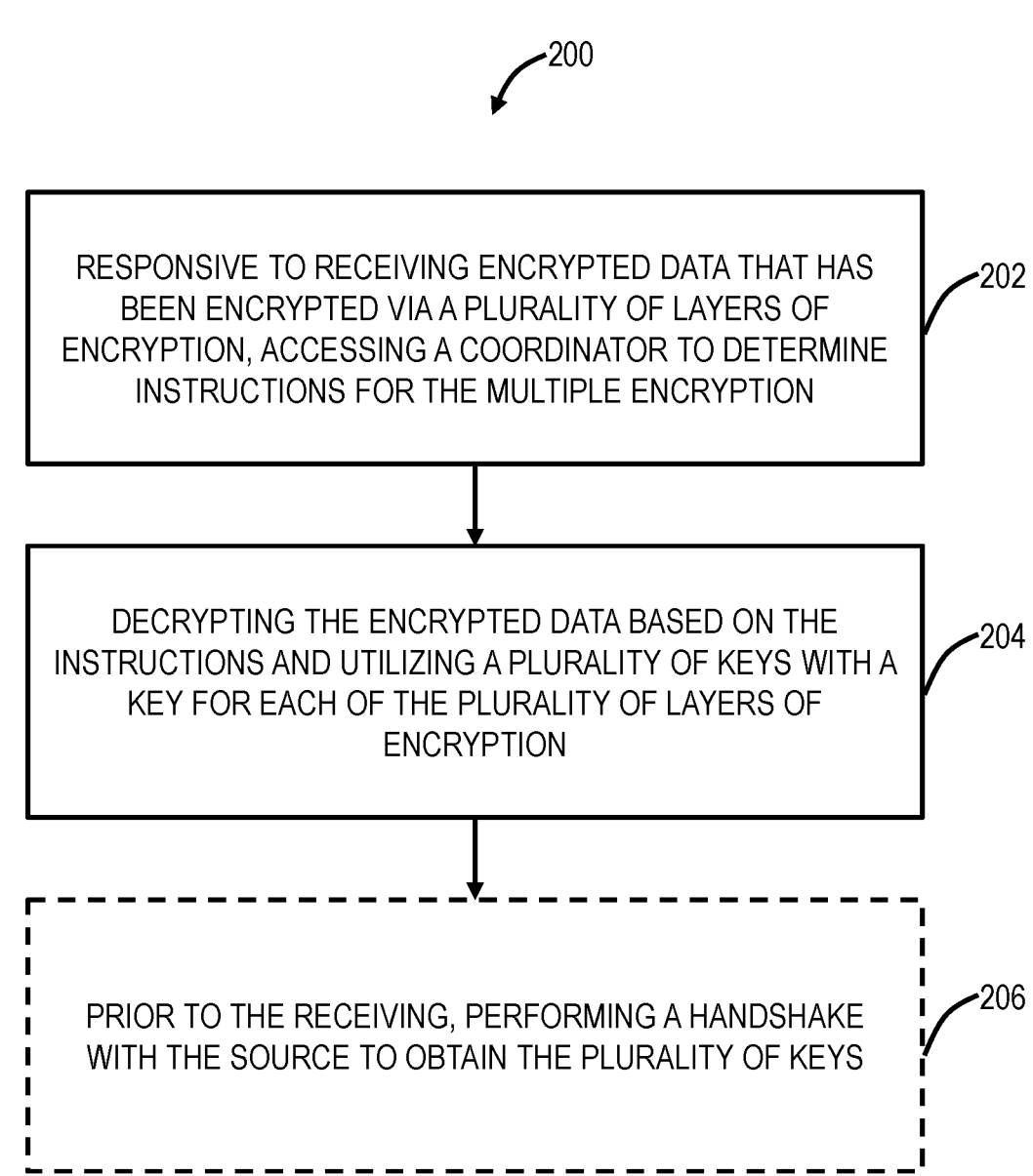

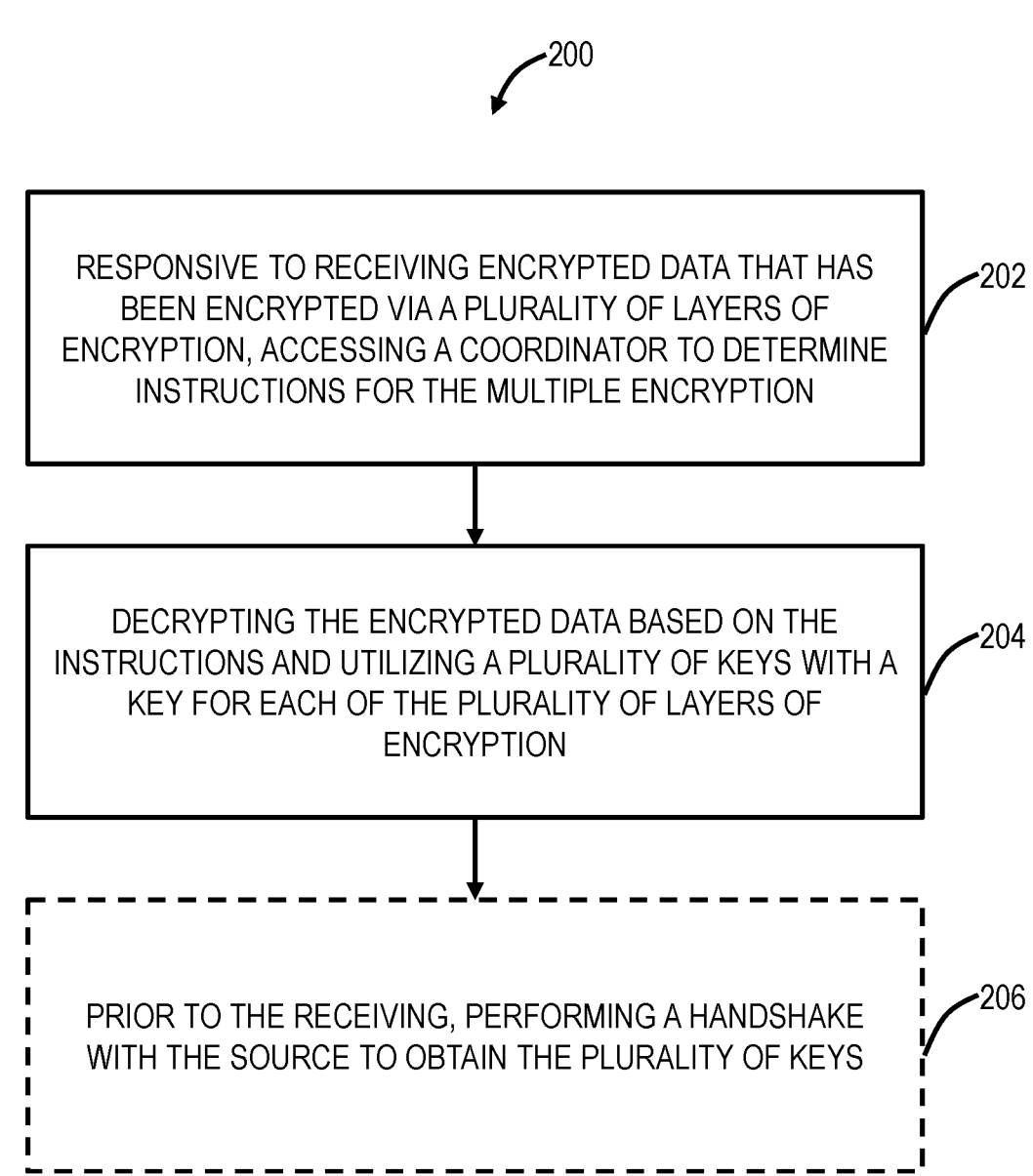—200

RESPONSIVE TO RECEIVING ENCRYPTED DATA THAT HAS BEEN ENCRYPTED VIA A PLURALITY OF LAYERS OF ENCRYPTION, ACCESSING A COORDINATOR TO DETERMINE INSTRUCTIONS FOR THE MULTIPLE ENCRYPTION —202

DECRYPTING THE ENCRYPTED DATA BASED ON THE INSTRUCTIONS AND UTILIZING A PLURALITY OF KEYS WITH A KEY FOR EACH OF THE PLURALITY OF LAYERS OF ENCRYPTION —204

PRIOR TO THE RECEIVING, PERFORMING A HANDSHAKE WITH THE SOURCE TO OBTAIN THE PLURALITY OF KEYS —206

*FIG. 2*

COORDINATION AND MANAGEMENT OF KEYS AND INSTRUCTIONS FOR MULTIPLE ENCRYPTION

FIELD OF THE DISCLOSURE

The present disclosure relates generally to computing. More particularly, the present disclosure relates to systems and methods for coordination and management of keys and instructions for multiple encryption.

BACKGROUND OF THE DISCLOSURE

Encryption is a process of encoding information for security purposes. Specifically, encryption involves converting an original representation of the information into an alternative form that is only accessible, via decryption by an authorized recipient. As described herein, the information can be any type of data in computing and networking, e.g., files, emails, video streams, and the like. In computing and networking, encryption is used to ensure confidentiality as data may be accessed on a user's device, in cloud storage, on the Internet, as well as being in transit over the Internet. The process of encrypting and decrypting messages involves keys. The two main types of keys in cryptographic systems are symmetric-key and public-key (also known as asymmetric-key). In symmetric-key schemes, the encryption and decryption keys are the same. Communicating parties must have the same key in order to achieve secure communication. In public-key encryption schemes, the encryption key is published for anyone to use and encrypt messages. However, only the receiving party has access to the decryption key that enables messages to be read.

Multiple encryption is the process of encrypting already encrypted information one or more times, either using the same or a different algorithm. It is also known as cascade encryption, cascade ciphering, multiple encryption, and superencipherment. Superencryption refers to the outer-level encryption of a multiple encryption.

BRIEF SUMMARY OF THE DISCLOSURE

The present disclosure relates to systems and methods for coordination and management of keys and instructions for multiple encryption. With the improvement in computing, there will be a need for multiple encryption for additional security. However, multiple encryption is difficult to manage and implement between parties. If a user uses multiple encryption to secure their data, the safest option is to use multiple independent keys and store them in separate places. There is also a requirement to keep track of which key would need to be used at what time, i.e., order, as each layer of encryption will need to be decrypted in the reverse order of how it was originally encrypted. The more layers of encryption, the more difficult this process becomes. Accordingly, the present disclosure can provide an overseer or coordinator which is configured to assist in managing multiple encryption of data. Specifically, the overseer or coordinator could keep instructions as well as possibly the keys for decryption. The present disclosure contemplates keeping the instructions of how to decrypt secret in a similar manner as the keys themselves, providing additional security. That is, the decryption instructions themselves become secret similar to the keys for decryption. In another embodiment, the instructions can be provided with or within the keys.

In various embodiments, the present disclosure includes a method having steps, a computing device configured to implement the steps, a cloud service configured to implement the steps, and a non-transitory computer-readable medium storing instructions for programming one or more processors to execute the steps. The steps include, responsive to receiving encrypted data that has been encrypted via a plurality of layers of encryption, accessing a coordinator to determine instructions for multiple encryption; and decrypting the encrypted data based on the instructions and utilizing a plurality of keys with a key for each of the plurality of layers of encryption. The steps can further include, prior to the receiving, performing a handshake with the source to obtain the plurality of keys. The instructions can include details which describe any of a direction of the plurality of layers of encryption, an encryption algorithm for each of the plurality of layers of encryption, and identification of the plurality of keys for each of the plurality of layers of encryption. The plurality of layers of encryption can include symmetric-key encryption, asymmetric-key encryption, and a combination thereof.

The coordinator can be located separate from a recipient of the encrypted data, and wherein the coordinator securely stores the plurality of keys and performs the decrypting for the recipient. The recipient can be unaware of the instructions which include any of a direction of the plurality of layers of encryption, an encryption algorithm for each of the plurality of layers of encryption, and identification of the plurality of keys for each of the plurality of layers of encryption. The steps can further include, responsive to either receiving the encrypted data or a notification of the encrypted data by the recipient, communicating to the coordinator by the recipient to decrypt the encrypted data; and securely transmitting the decrypted data to the recipient after the decrypting. The coordinator can be located at a recipient, and the steps can further include, prior to the receiving, performing a handshake with the source to obtain the plurality of keys, wherein the instructions are included with the plurality of keys. The instructions can be distributed between the plurality of keys such that at least one key includes instructions for a different layer of encryption from the at least one key. The plurality of keys can be associated with at least two users, and the steps can further include obtaining consent from the at least two users by the coordinator prior to the decrypting.

BRIEF DESCRIPTION OF THE DRAWINGS

The present disclosure is illustrated and described herein with reference to the various drawings, in which like reference numbers are used to denote like system components/method steps, as appropriate, and in which:

FIG. 1 is a network diagram of a network illustrating two users communicating over a network of data with multiple encryption.

FIG. 2 is a flowchart of a process for managing multiple encryption by the coordinator.

DETAILED DESCRIPTION OF THE DISCLOSURE

Figure 3:
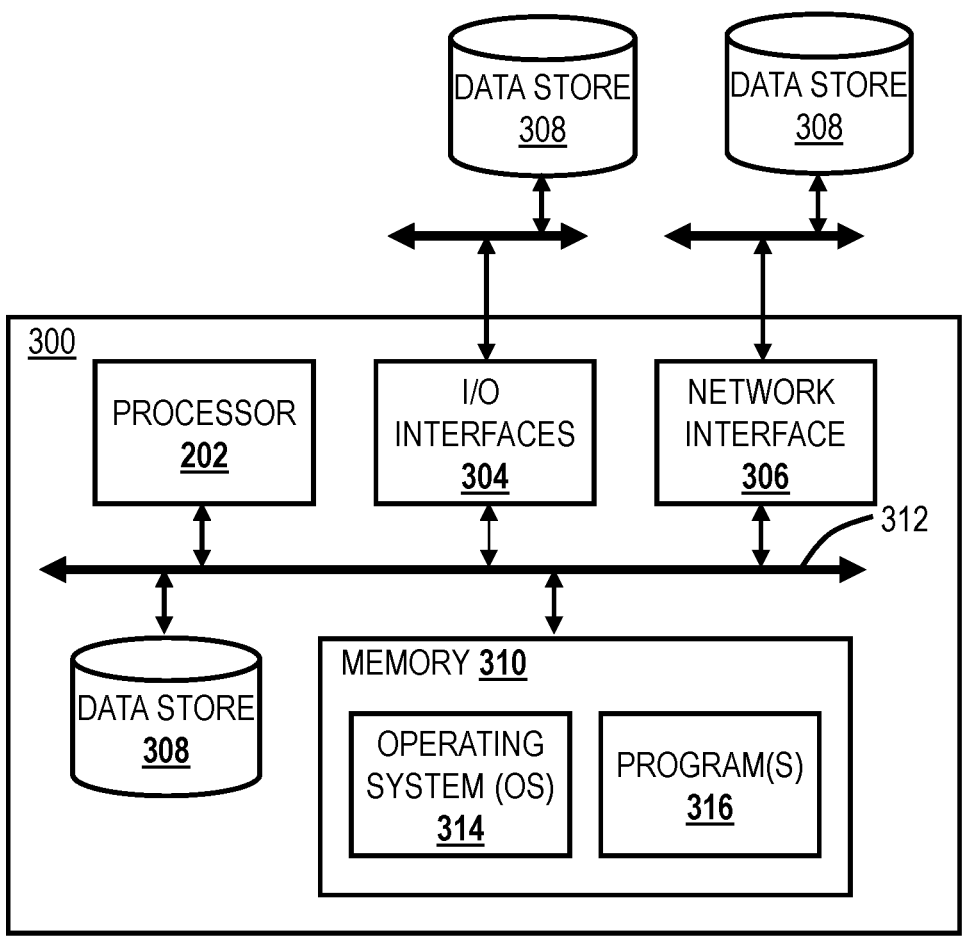
FIG. 3 is a block diagram of a computing system, which may implement any of the devices or processes described herein.

Again, the present disclosure relates to systems and methods for management of independent keys for multiple encryption. Again, multiple encryption is difficult to manage and implement between parties, namely in terms of key management and instructions, i.e., which keys for which layer of encryption and what is the order of decryption. Utilizing multiple encryption methods/keys has always been a cumbersome process. Considering what type of encryption algorithm has been used, where the keys are located, or how many different rounds of encryption has taken to encrypt data makes a simple act of encryption to be a complex and computationally expensive process. As computing continues to become stronger, the multiple encryption approach has resurfaced but due to the describe complexity above it has not been fully utilized yet.

The present disclosure contemplates a multidimensional approach for managing multiple encryption. In an embodiment, the present disclosure includes utilizing a coordinator or overseer which is capable of identifying/tracking/managing each layer of the encryption that has been used to encrypt an object. In another embodiment, the present disclosure can include the coordinator function embedded as instructions in the keys.

With this approach, multiple encryption is manageable, it is possible to use multiple layers efficiently, the layers of encryption are also maintained secret, the coordinator or overseer can track improper access to encrypted data, and the like. That is, the present disclosure seeks to make multiple encryption easier to manage, less complex to implement, etc., thereby enabling its use in multiple use cases.

Network Diagram

FIG. 1 is a network diagram of a network 100 illustrating two users 102, 104 communicating over a network 106 of data 108 with multiple encryption. The users 102, 104 each include a computing device, such as based on the computing system 300 illustrated in FIG. 3, including a laptop, desktop, tablet, mobile device, etc. The users 102, 104 are parties to sharing the data 108, e.g., a file, email, streaming content, etc., and the users 102, 104 can be a file server, a content provider, a cloud provider, or an actual user. That is, the term user 102, 104 is meant to refer to any computing device capable of encrypting, transmitting, receiving, and decrypting the data 108. The user 102 can be referred to as a source since the user 102 is where the data 108 is encrypted with the multiple encryption. The network 106 can be the Internet, a Wide Area Network (WAN), one or more clouds, as well as combinations thereof.

Additionally, the network 100 includes a coordinator 110. The coordinator 110 can also be referred to as an overseer. The coordinator 110 provides a coordinator or coordination function for managing the multiple encryption. In some embodiments, the coordinator 110 can be located separate from the users 102, 104, as is illustrated in FIG. 1. In other embodiments, the coordinator 110 can be functionality located at the user 104. Generally, the coordinator 110 is configured to assist in the management of the multiple encryption.

The data 108 is encrypted by the user 102 using multiple encryption where there are multiple layers 112 of encryption for the data 108. The process of encrypting by the user 102 is as is known in the art and the present disclosure contemplates symmetric-key or asymmetric-key approaches, as well as combinations thereof for different layers 112. The encrypted data 108 is encrypted in a direction of the multiple layers 112, the direction being the order in which the data 108 is encrypted and with what type of encryption. For example, Layer 1—RSA
Layer 2—Triple Data Encryption Algorithm (DES)
Layer 3—Blowfish
Etc.

There is also a key of a plurality of keys 114 for each layer of the multiple layers 112. There are instructions associated with the multiple encryption, needed by the coordinator 110 to enable decryption of the encrypted data 108. The source user 102 has the instructions by virtue of performing the encryption on the data 108. The present disclosure includes the coordinator 110 for managing the instructions to decrypt the data 108.

Process

FIG. 2 is a flowchart of a process 200 for managing multiple encryption by the coordinator 110. The process 200 contemplates implementation as a method having steps, via a computing device configured to implement the steps, and via a non-transitory computer-readable medium storing instructions for programming one or more processors to execute the steps. The process 200 is described with reference to the coordinator 110.

The process 200 includes, responsive to receiving encrypted data that has been encrypted via a plurality of layers of encryption, accessing a coordinator to determine instructions for the multiple encryption (step 202); and decrypting the encrypted data based on the instructions and utilizing a plurality of keys with a key for each of the plurality of layers of encryption (step 204). The process 200 can further include, prior to the receiving, performing a handshake with the source to obtain the plurality of keys (step 206). Of note, the process of the handshake for sharing the keys is as is known in the art. The present disclosure contemplates performing the handshake with the coordinator 110, including sharing the instructions with the coordinator 110.

The instructions can include details which describe any of a direction of the plurality of layers of encryption, an encryption algorithm for each of the plurality of layers of encryption, and identification of the plurality of keys for each of the plurality of layers of encryption. In particular, the instructions are known by the source, i.e., the user 102, and need by the coordinator 110 for decrypting the encrypted data.

Again, the process of encrypting and decrypting messages involves the plurality of keys. The process 200 contemplates use of either of the two main types of keys in cryptographic systems symmetric-key and asymmetric-key. In fact, the plurality of layers of encryption can include symmetric-key encryption, asymmetric-key encryption, and a combination thereof. That is, one layer can be symmetric, another layer can be asymmetric, etc. Also, it is possible for all layers to be symmetric, as well as all layers being asymmetric.

The process 200 is described with reference to the coordinator 110. There can be two different approaches with the coordinator 110, namely one where the coordinator 110 is located separate from the recipient, and one where the coordinator 110 is functionality included at the recipient. Of note, the instructions, i.e., what key to use on what layer, what order to decrypt, what algorithm to use for each layer, etc., are kept as secure as possible, similar to keeping the keys secure. When the coordinator 110 is located separate from the recipient, the recipient does not have visibility of the keys or the instructions. When the coordinator 110 is functionally at the recipient, the instructions can be distributed across different keys in various approaches.

When the coordinator 110 is located separate from a recipient of the encrypted data, the coordinator can securely store the plurality of keys and perform the decrypting for the recipient. Here, the coordinator 110 can store hashed versions of each key along with directions for which key should be used in what order. As keys are given that match the hashes, the coordinator 110 can feed the keys to the layers of encryption and handle this process for the user. The recipient can be unaware of the instructions which include any of a direction of the plurality of layers of encryption, an encryption algorithm for each of the plurality of layers of encryption, and identification of the plurality of keys for each of the plurality of layers of encryption. The process 200 can further include, responsive to either receiving the encrypted data or a notification of the encrypted data by the recipient, communicating to the coordinator by the recipient to decrypt the encrypted data; and securely transmitting the decrypted data to the recipient after the decrypting. For example, the coordinator 110 can send the decrypted via an encrypted tunnel or the like.

When the coordinator 110 is functionality included at the recipient, the process 200 can include, prior to the receiving, performing a handshake with the source to obtain the plurality of keys, wherein the instructions are included with the plurality of keys. The keys can be updated to include the instructions therein. The instructions would be ignored by the decryption process but would provide valuable information such as what order to use that particular key in. That is, a key would hold the key value separately from the instructions.

The instructions with the keys can be simple or complex as necessary. For example, if there are three keys, they could each have instructions only for themselves. Such as, for example:

key1 has instructions for key1,
key2 has instructions for key2, and
key3 has instructions for key3.

However, instructions could also be more complicated such as including information on what encryption algorithm to use at what point and when to use a different key. Such as, for example:

key1 has instructions for key1, including use key1 with RSA,
key2 has instructions for key2, including use key2 with Triple DES, and
key3 has instructions for key3, including use key3 with Blowfish.

It is even possible to mix up the instructions for additional security. Here, the instructions can be distributed between the plurality of keys such that at least one key includes instructions for a different layer of encryption from the at least one key. Such as, for example:

key1 instructions=>use RSA for layer 2, use key3 for layer 1,
key2 instructions=>use Triple DES for layer 3, use key1 for layer 2, and
key3 instructions=>use Blowfish for layer 1, use key2 for layer 3.

This effectively makes the keys into their own management system, only requiring the coordinator 110 to be able to parse or decrypt the instructions within the keys in order to know how to use the keys and decrypt the requested data. This way all keys could be given in any order and the coordinator 110 would know exactly what to do.

Use Cases

The techniques described herein can be implemented in software programs at a user device, allowing the multiple encryption to be simply implemented, both on the encrypting and decrypting. By making multiple encryption easier, it will encourage use and using existing cryptography methods more effectively.

With computing power increasing, it is important to be able to take as many steps as possible to increase secrecy and security surrounding cybersecurity. There is also a use case where there are parties of two or more individuals who want encrypt data as a group, but be able to have each individual hold a key, so that the data cannot be decrypted without consent from each keyholder. For example, the plurality of keys can be associated with at least two users, and the process 200 can further include obtaining consent from the at least two users by the coordinator prior to the decrypting.

Computing System

FIG. 3 is a block diagram of a computing system 300, which may implement any of the devices described herein. The computing system 300 may be a digital computer that, in terms of hardware architecture, generally includes a processor 302, input/output (I/O) interfaces 304, a network interface 306, a data store 308, and memory 310. It should be appreciated by those of ordinary skill in the art that FIG. 3 depicts the computing system 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 may be, for example, but not limited to, one or more buses or other wired or wireless connections, as is known in the art. The local interface 312 may have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 may be any custom made or commercially available processor, a Central Processing Unit (CPU), an auxiliary processor among several processors associated with the computing system 300, a semiconductor-based microprocessor (in the form of a microchip or chipset), or generally any device for executing software instructions. When the computing system 300 is in operation, the processor 302 is configured to execute software stored within the memory 310, to communicate data to and from the memory 310, and to generally control operations of the computing system 300 pursuant to the software instructions. The I/O interfaces 304 may be used to receive user input from and/or for providing system output to one or more devices or components.

The network interface 306 may be used to enable the computing system 300 to communicate on a network, such as the Internet. The network interface 306 may include, for example, an Ethernet card or adapter or a Wireless Local Area Network (WLAN) card or adapter. The network interface 306 may include address, control, and/or data connections to enable appropriate communications on the network. A data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 308 may incorporate electronic, magnetic, optical, and/or other types of storage media. In one example, the data store 208 may be located internal to the computing system 300, such as, for example, an internal hard drive connected to the local interface 312 in the computing system 300. Additionally, in another embodiment, the data store 308 may be located external to the computing system 300 such as, for example, an external hard drive connected to the I/O interfaces 204 (e.g., SCSI or USB connection). In a further embodiment, the data store 208 may be connected to the computing system 300 through a network, such as, for example, a network-attached file server.

The memory 310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 may include one or more software programs, each of which includes an ordered listing of executable instructions for implementing logical functions. The software in the memory 310 includes a suitable Operating System (O/S) 314 and one or more programs 316. The operating system 314 essentially controls the execution of other computer programs, such as the one or more programs 316, and provides scheduling, input-output control, file and data management, memory management, and communication control and related services. The one or more programs 316 may be configured to implement the various processes, algorithms, methods, techniques, etc. described herein.

Of note, the general architecture of the computing system 300 can define any device described herein. However, the computing system 300 is merely presented as an example architecture for illustration purposes. Other physical embodiments are contemplated, including virtual machines (VM), software containers, appliances, network devices, and the like.

In an embodiment, the various techniques described herein can be implemented via a cloud service. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. The phrase "Software as a Service" (SaaS) is sometimes used to describe application programs offered through cloud computing. A common shorthand for a provided cloud computing service (or even an aggregation of all existing cloud services) is "the cloud."

CONCLUSION

It will be appreciated that some embodiments described herein may include one or more generic or specialized processors ("one or more processors") such as microprocessors; central processing units (CPUs); digital signal processors (DSPs): customized processors such as network processors (NPs) or network processing units (NPUs), graphics processing units (GPUs), or the like; field programmable gate arrays (FPGAs); and the like along with unique stored program instructions (including both software and firmware)

for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a read-only memory (ROM), a programmable read-only memory (PROM), an erasable programmable read-only memory (EPROM), an electrically erasable programmable read-only memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections include headers for various embodiments and those skilled in the art will appreciate these various embodiments may be used in combination with one another as well as individually.

What is claimed is:

1. A method for managing multiple encryption, implemented at a recipient, the method comprising steps of:

performing handshake between a source and a coordinator located at the recipient to obtain a plurality of keys, each key including a key value and an instruction payload comprising coordinator-readable metadata specifying at least one of a decryption layer order, an encryption algorithm, or an association with another key of the plurality of keys, wherein instructions for the multiple encryption are included with the plurality of keys;

responsive to receiving encrypted data that has been encrypted via a plurality of layers of encryption of the multiple encryption, accessing and parsing by the coordinator the instruction payloads to determine the instructions for the plurality of layers of encryption of the multiple encryption, wherein the instructions are distributed between the plurality of keys such that at least one key includes instructions specifying an encryption algorithm or an encryption layer associated with another key of the plurality of keys; and decrypting the encrypted data based on the parsed instructions and utilizing a plurality of keys with a key for each of the plurality of layers of encryption.

2. The method of claim 1, wherein the instructions include details which describe any of a direction of the plurality of layers of encryption, an encryption algorithm for each of the plurality of layers of encryption, and identification of the plurality of keys for each of the plurality of layers of encryption.

3. The method of claim 1, wherein the plurality of layers of encryption include symmetric-key encryption, asymmetric-key encryption, and a combination thereof.

4. The method of claim 1, wherein the plurality of keys are associated with at least two users, and wherein the steps further include:

obtaining consent from the at least two users by the coordinator prior to the decrypting.

5. A non-transitory computer-readable medium comprising instructions that, when executed, cause one or more processors at a recipient to perform steps of:

performing handshake between a source and a coordinator located at the recipient to obtain a plurality of keys, each key including a key value and an instruction payload comprising coordinator-readable metadata specifying at least one of a decryption layer order an encryption algorithm, or an association with another key of the plurality of keys, wherein instructions for the multiple encryption are included with the plurality of keys;

responsive to receiving encrypted data that has been encrypted via a plurality of layers of encryption of the multiple encryption, accessing and parsing by the coordinator the instruction payloads to determine the instructions for plurality of layers of encryption of the multiple encryption, wherein the instructions are distributed between the plurality of keys such that at least one key includes instructions specifying an encryption algorithm or an encryption layer associated with another key of the plurality of keys; and decrypting the encrypted data based on the parsed instructions and utilizing a plurality of keys with a key for each of the plurality of layers of encryption.

6. The non-transitory computer-readable medium of claim 5, wherein the instructions include details which describe any of a direction of the plurality of layers of encryption, an encryption algorithm for each of the plurality of layers of encryption, and identification of the plurality of keys for each of the plurality of layers of encryption.

7. The non-transitory computer-readable medium of claim 5, wherein the plurality of layers of encryption include symmetric-key encryption, asymmetric-key encryption, and a combination thereof.

8. The non-transitory computer-readable medium of claim 5, wherein the plurality of keys are associated with at least two users, and wherein the steps further include:

obtaining consent from the at least two users by the coordinator prior to the decrypting.

* * * * *